United States Patent
Okamoto

(10) Patent No.: US 11,746,234 B2
(45) Date of Patent: *Sep. 5, 2023

(54) POLYAMIDE RESIN COMPOSITION AND MOLDED ARTICLE

(71) Applicant: MITSUBISHI ENGINEERING-PLASTICS CORPORATION, Tokyo (JP)

(72) Inventor: Fumihito Okamoto, Hiratsuka (JP)

(73) Assignee: GLOBAL POLYACETAL CO., LTD., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/982,379

(22) PCT Filed: Mar. 29, 2019

(86) PCT No.: PCT/JP2019/014084
§ 371 (c)(1),
(2) Date: Sep. 18, 2020

(87) PCT Pub. No.: WO2019/194099
PCT Pub. Date: Oct. 10, 2019

(65) Prior Publication Data
US 2021/0032467 A1  Feb. 4, 2021

(30) Foreign Application Priority Data

Apr. 2, 2018  (JP) ................. 2018-070621
Dec. 27, 2018  (JP) ................. 2018-244712

(51) Int. Cl.
C08L 77/06  (2006.01)
B29C 65/16  (2006.01)

(52) U.S. Cl.
CPC ............. *C08L 77/06* (2013.01); *B29C 65/16* (2013.01); *C08L 2201/02* (2013.01); *C08L 2205/025* (2013.01); *C08L 2205/03* (2013.01); *C08L 2205/035* (2013.01); *C08L 2310/00* (2013.01)

(58) Field of Classification Search
CPC ........... C08L 77/00–12; C08L 2201/02; C08L 2201/10; C08L 2666/72; C08L 2666/84
See application file for complete search history.

(56) References Cited

U.S. PATENT DOCUMENTS

| | | | |
|---|---|---|---|
| 2007/0129475 A1 | 6/2007 | Sakata et al. | |
| 2007/0267607 A1 | 11/2007 | Ohkawa | |
| 2012/0172512 A1* | 7/2012 | Ishii | C08L 77/06 524/427 |

FOREIGN PATENT DOCUMENTS

| | | |
|---|---|---|
| CN | 1863870 A | 11/2006 |
| CN | 1914278 A | 2/2007 |
| CN | 102575100 A | 7/2012 |
| CN | 102850730 A | 1/2013 |
| EP | 2 479 219 A1 | 7/2012 |
| JP | 2002-332397 A | 11/2002 |
| JP | 2008-266434 A | 11/2008 |
| JP | 2008266434 A * | 11/2008 |
| JP | 2008-308526 A | 12/2008 |
| JP | 2009007557 A * | 1/2009 |
| JP | 2009-108153 A | 5/2009 |
| JP | 2014-1336 A | 1/2014 |
| JP | 2014-19738 A | 2/2014 |
| JP | 2017-115093 A | 6/2017 |
| JP | 2018-12760 A | 1/2018 |
| WO | WO 2011/030911 A | 3/2011 |
| WO | WO 2016/002660 A1 | 1/2016 |

OTHER PUBLICATIONS

JP 2008266434 A (Nov. 2018) machine translation.*
JP 2009007557 A (Jan. 2009) machine translation.*
International Preliminary Report on Patentability, dated Oct. 6, 2020, and Written Opinion of the International Searching Authority, dated Jun. 25, 2019, for International Application No. PCT/JP2019/014084, with an English translation.
Extended European Search Report for European Patent Application No. 19782214.1, dated Dec. 10, 2021.
Chinese Office Action and Search Report for Chinese Application No. 201980024155.X, dated Sep. 22, 2022, with an English translation of the Chinese Office Action.
Japanese Office Action for Japanese Application No. 2020-512220, dated Nov. 29, 2022, with an English translation.
Office Action dated Apr. 11, 2023 issued in the corresponding Japanese Patent Application No. 2020-512220 with English machine translation.
Office Action dated Jan. 19, 2023 issued in the corresponding Chinese Patent Application No. 201980024155.X.

* cited by examiner

*Primary Examiner* — Ana L. Woodward
(74) *Attorney, Agent, or Firm* — BIRCH, STEWART, KOLASCH & BIRCH, LLP

(57) ABSTRACT

To provide a polyamide resin composition that contains a halogen-containing flame retardant, which excels in flame retardance, well suppressed from degrading the transmittance due to darkening, and such molded article. The polyamide resin composition contains a polyamide resin, 1 to 10% by mass of a halogen-containing flame retardant, and 1 to 5% by mass of antimony oxide, the polyamide resin composition having a phosphorus atom concentration of $1.50 \times 10^{-2}$% by mass or less.

19 Claims, 1 Drawing Sheet

POLYAMIDE RESIN COMPOSITION AND MOLDED ARTICLE

TECHNICAL FIELD

This invention relates to a polyamide resin composition and a molded article.

BACKGROUND ART

Polyamide resin, a representative engineering plastic, is easy to process, excels in mechanical properties, electrical properties, heat resistance and other physical/chemical properties, and has therefore been widely used for vehicle components, electric/electronic equipment components, other precision equipment components and so forth. Polyamide resin in recent years has also been used increasingly for manufacturing components with intricate shapes, wherein joining of any components having a hollow part, such as intake manifold, has been accomplished by using various welding techniques, such as adhesive welding, vibration welding, ultrasonic welding, hot plate welding, injection welding and laser welding.

Laser welding is a method by which a resin member that transmits (or does not absorb or only weakly absorbs) laser light (occasionally referred to as "transmitting resin member", hereinafter), and a resin member that absorbs laser light (occasionally referred to as "absorbing resin member", hereinafter) are brought into contact and welded, to thereby join both resin members. More specifically, this is a method by which laser light is irradiated from the side of the transmitting resin member, so as to melt the absorbing resin member that forms the joint face with energy of the laser light, to join the members. Since laser welding produces neither debris nor burr, causing less damage on the product, and since polyamide resin per se is a material with a relatively high laser transmittance, so that process of polyamide resin with the aid of laser welding has been attracting attention in these days.

The transmitting resin member is typically obtainable by molding a light transmitting resin composition. As this sort of light transmitting resin composition, Patent Literature 1 discloses a polyamide resin composition used for laser welding, the polyamide resin composition including 100 parts by mass of (A) polyamide resin; and 1 to 150 parts by mass of a reinforcing filler (B) having a refractive index at 23° C. of 1.560 to 1.600, at least one kind of monomer composing at least one kind of the (A) polyamide resin containing an aromatic ring.

CITATION LIST

Patent Literature

[Patent Literature 1] JP-A-2008-308526

SUMMARY OF THE INVENTION

Technical Problem

There is now increasing need for the light transmitting resin composition to satisfy flame retardance. Use of halogen-containing flame retardant, as a flame retardant, usually needs antimony oxide as a flame retardant auxiliary. The resin composition containing antimony oxide will, however, degrade transmittance of the resultant molded article. It is therefore an object of this invention to solve the problem, and to provide a polyamide resin composition that contains a halogen-containing flame retardant, which excels in flame retardance, well suppressed from degrading the transmittance due to darkening, and such molded article.

Solution to Problem

The present inventors conducted research to address the above-mentioned problems, and as a result, discovered that antimony oxide is darkened by reacting to phosphorus atom in the polyamide resin composition. Then, they obtained the polyamide resin composition that contains a halogen-containing flame retardant, which excels in flame retardance, well suppressed from degrading the transmittance due to darkening by reducing phosphorus atom concentration in the polyamide resin composition. Specifically, the problems described above are solved by the following means <1>, and preferably by the following means <2> to <13>.

<1> A polyamide resin composition comprising a polyamide resin, 1 to 10% by mass of a halogen-containing flame retardant, and 1 to 5% by mass of antimony oxide, the polyamide resin composition having a phosphorus atom concentration of $1.50 \times 10^{-2}$% by mass or less.

<2> The polyamide resin composition of <1>, wherein the polyamide resin contains a semi-aromatic polyamide resin.

<3> The polyamide resin composition of <1> or <2>, wherein the polyamide resin contains a polyamide resin contains a structural unit derived from a diamine and structural unit derived from a dicarboxylic acid, 50 mol % or more of the structural unit derived from a diamine being derived from xylylenediamine, and 50 mol % or more of the structural unit derived from a dicarboxylic acid being derived from a straight-chain α,ω-dicarboxylic acid having 4 to 20 carbon atoms.

<4> The polyamide resin composition of any one of <1> to <3>, wherein the polyamide resin contains a polyamide resin contains a structural unit derived from a diamine and structural unit derived from a dicarboxylic acid, 70 mol % or more of the structural unit derived from a diamine being derived from xylylenediamine, and 70 mol % or more of the structural unit derived from a dicarboxylic acid being derived from a straight-chain α,ω-dicarboxylic acid having 4 to 20 carbon atoms.

<5> The polyamide resin composition of any one of <1> to <4>, wherein the halogen-containing flame retardant is a bromine-containing flame retardant.

<6> The polyamide resin composition of any one of <1> to <5>, wherein the halogen-containing flame retardant is a brominated polystyrene.

<7> The polyamide resin composition of any one of <1> to <6>, wherein the antimony oxide is antimony trioxide.

<8> The polyamide resin composition of any one of <1> to <7>, wherein the phosphorus atom in the polyamide resin is derived from hypophosphite.

<9> The polyamide resin composition of any one of <1> to <8>, further comprising 20 to 69% by mass of a glass fiber.

<10> The polyamide resin composition of any one of <1> to <9>, further comprising 0.001% by mass to 5.0% by mass of a light transmitting dye.

<11> The polyamide resin composition of any one of <1> to <10>, complying with flammability rating V-0 when molded into a thickness of 1.5 mm and measured according to the UL94 standard.

<12> The polyamide resin composition of any one of <1> to <11>, having a light transmittance measured at 1070 nm of 5%- or larger, when formed into a thickness of 2.0 mm.

<13> A kit comprising:
a polyamide resin composition described in any one of <1> to <12>, and
a light absorbing resin composition that contains a thermoplastic resin and a light absorbing dye.

<14> A method for manufacturing a molded article, the method comprising joining, by laser welding, a molded article formed of a polyamide resin composition described in any one of <1> to <12>, and a molded article formed of a light absorbing resin composition that contains a thermoplastic resin and a light absorbing dye.

<15> A molded article formed of a polyamide resin composition described in any one of <1> to <12>, or the kit described in <13>.

Advantageous Effects of Invention

This invention made it possible to provide a polyamide resin composition that contains a halogen-containing flame retardant, which excels in flame retardance, well suppressed from degrading the transmittance due to darkening, and such molded article.

DESCRIPTION OF EMBODIMENTS

Figure 1:
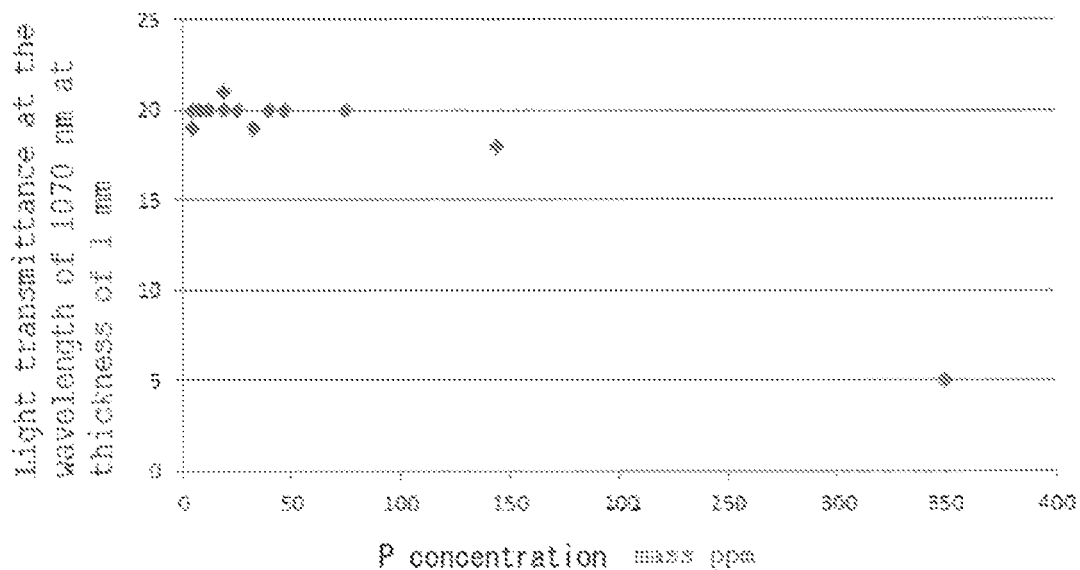
FIG. 1 A drawing illustrating mapping regarding 1-mm-thick molded articles of resin compositions of Examples and Comparative Examples, while plotting transmittance at 1070 nm on the ordinate, and plotting phosphorus atom concentration on the abscissa.

This invention will be detailed below. Note that all numerical ranges given in this patent specification, using "to" preceded and succeeded by numerals, are used to represent the ranges including these numerals respectively as the lower and upper limit values.

The polyamide resin composition of this invention (may simply be referred to as "resin composition", hereinafter) is a polyamide resin that includes a polyamide resin, 1 to 10% by mass of a halogen-containing flame retardant, and 1 to 5% by mass of antimony oxide, and is featured by that the polyamide resin composition has a phosphorus atom concentration of $1.50 \times 10^{-2}$% by mass or less. With such structure, it now becomes possible to provide a polyamide resin composition that excels in flame retardance, and well suppressed from degrading the transmittance due to darkening. More specifically, even if the halogen-containing flame retardant is blended for the purpose of imparting flame retardance to the polyamide resin composition, and even if antimony oxide is additionally used as the flame retardant auxiliary for the halogen-containing flame retardant, darkening attributable to antimony oxide can effectively be suppressed by controlling the phosphorus atom concentration contained in the polyamide resin.

In addition, the polyamide resin composition of this invention can achieve high transmittance even if the light transmitting dye is blended, and is therefore suitably applicable to a light transmitting resin composition for laser welding. Moreover, the molded article will have good visual appearance, low L value when measured by the reflection method, and excellent levels of various mechanical strengths.

This invention will be detailed below.

<Polyamide Resin>

The resin composition of this invention contains a polyamide resin.

Phosphorus atom concentration in the resin composition of this invention is $1.50 \times 10^{-2}$% by mass or less, preferably $1.45 \times 10^{-2}$% by mass or less, more preferably $1.40 \times 10^{-2}$% by mass or less, even more preferably $1.35 \times 10^{-2}$% by mass or less, yet more preferably $1.30 \times 10^{-2}$% by mass or less, furthermore preferably $1.25 \times 10^{-2}$% by mass or less, even furthermore preferably $1.20 \times 10^{-2}$% by mass or less, yet further more preferably $0.90 \times 10^{-2}$% by mass or less, and may be $0.82 \times 10^{-2}$% by mass or less. The lower limit value might be 0% by mass, but practically $1.00 \times 10^{-2}$% by mass or above.

At least a part of phosphorus atom (preferably 80% by mass of more of phosphorus atom) in the polyamide resin composition of this invention is more preferably derived from hypophosphite.

The polyamide resin used in this invention employable here may be any of known polyamide resins, without special limitation on the types. Regarding the polyamide resin, the description in paragraphs [0011] to [0013] of JP-A-2011-132550, for example, may be referred to.

The polyamide resin used in this invention preferably contains a semi-aromatic polyamide resin. Now, the semi-aromatic polyamide resin means that it contains a structural unit derived from a diamine and structural unit derived from a dicarboxylic acid, in which aromatic group-containing structural unit accounts for 20 to 80 mol % of the total structural unit which is the sum of the structural unit derived from a diamine and the structural unit derived from a dicarboxylic acid. It is more preferable that the aromatic group-containing structural unit accounts for 40 to 60 mol % of the total structural unit which is the sum of the structural unit derived from a diamine and the structural unit derived from a dicarboxylic acid. With such semi-aromatic polyamide resin used therein, an obtainable molded article will have enhanced mechanical strength. The semi-aromatic polyamide resin is exemplified by terephthalate-based polyamide resin (polyamide 6T, polyamide 9T, polyamide 10T), and xylylenediamine-based polyamide resin described later.

At least one kind of polyamide resin used in this invention contains a structural unit derived from a diamine and structural unit derived from a dicarboxylic acid, wherein 50 mol % or more of the structural unit derived from a diamine is preferably derived from xylylenediamine (preferably metaxylylenediamine), and 50 mol % or more of the structural unit derived from a dicarboxylic acid is preferably derived from a straight-chain α,ω-dicarboxylic acid having 4 to 20 carbon atoms. In this patent specification, the polyamide resin may occasionally be referred to as xylylenediamine-based polyamide resin.

More preferably, 70 mol % or more of the structural unit derived from a diamine of the xylylenediamine-based polyamide resin is derived from xylylenediamine, the percentage is more preferably 75 mol % or more, even more preferably 80 mol % or more, yet more preferably 85 mol % or more, and furthermore preferably 90 mol % or more. Meanwhile more preferably, 70 mol % or more of the structural unit derived from a dicarboxylic acid of the xylylenediamine-based polyamide resin is preferably derived from the straight-chain α,ω-dicarboxylic acid having 4 to 20 carbon atoms, the percentage is more preferably 80 mol % or more, even more preferably 90 mol % or more, and yet more preferably 95 mol % or more.

Diamine that is employable as a starting diamine component of the xylylenediamine-based polyamide resin, but other than metaxylylenediamine and paraxylylenediamine, is exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines such as 1,3-bis(aminomethyl) cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl) propane, bis(aminomethyl)decalin, and bis(aminomethyl) tricyclodecane; and aromatic ring-containing diamines such as bis(4-aminophenyl) ether, paraphenylenediamine, and bis(aminomethyl)naphthalene. Any one of them may be used, or two or more of them may be used in a mixed manner.

The straight-chain α,ω-dicarboxylic acid having 4 to 20 carbon atoms, suitably used as a starting dicarboxylic acid component of the xylylenediamine-based polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid. Any one of them may be used, or two or more of them may be used in a mixed manner. Among them, adipic acid and sebacic acid are more preferred since the polyamide resin will have a melting point within a range suitable for molding, and adipic acid is further preferred.

Dicarboxylic acid component, other than the straight-chain α,ω-dicarboxylic acid having 4 to 20 carbon atoms, is exemplified by phthalic acid compound such as isophthalic acid, terephthalic acid, and orthophthalic acid; and isomers of naphthalenedicarboxylic acid such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Any one kind of them may be used, or two or more kinds of them may be used in a combined manner.

A preferred embodiment of the xylylenediamine-based polyamide resin in this invention is exemplified by the one in which 50 mol % or more (preferably 70 mol % or more, and more preferably 90 mol % or more) of the structural unit derived from a diamine is derived from metaxylylenediamine, and 50 mol % or more (preferably 70 mol % or more, and more preferably 90 mol % or more) of the structural unit derived from a dicarboxylic acid is derived from adipic acid.

The polyamide resin, containing the structural unit derived from a diamine and the structural unit derived from a dicarboxylic acid as the major ingredients, does not absolutely exclude any other structural units, and may of course contain structural units derived from lactams such as ε-caprolactam and laurolactam; or from aliphatic aminocarboxylic acids such as aminocaproic acid and aminoundecanoic acid. Now the major ingredient means that the total number of the structural unit derived from a diamine and the structural unit derived from a dicarboxylic acid accounts for the largest percentage among all structural units composing the xylylenediamine-based polyamide resin. In this invention, the total number of the structural unit derived from a diamine and the structural unit derived from a dicarboxylic acid, in the xylylenediamine-based polyamide resin, preferably accounts for 90% or more of the total structural unit, which is more preferably 95% or more.

The polyamide resin preferably has a melting point of 150 to 350° C., which is more preferably 180 to 330° C., even more preferably 200 to 300° C., and yet more preferably 200 to 260° C.

The melting point may be measured by differential scanning calorimetry, in compliance with JIS K7121 and K7122.

The polyamide resin preferably has a number-average molecular weight (Mn) of 6,000 or larger at minimum, which is more preferably 8,000 or larger, even more preferably 10,000 or larger, yet more preferably 15,000 or larger, furthermore preferably 20,000 or larger, and again furthermore preferably 22,000 or larger. The upper limit of Mn is preferably 35,000 or below, more preferably 30,000 or below, even more preferably 28,000 or below, and yet more preferably 26,000 or below. Within these ranges, heat resistance, elastic modulus, dimensional stability, and moldability will be further improved.

The resin composition of this invention preferably contains 20 to 70% by mass of xylylenediamine-based polyamide resin relative to the resin composition. The percentage at which the xylylenediamine-based polyamide resin is contained in the resin composition is preferably 30% by mass or larger, and more preferably 40% by mass or larger. Meanwhile, the percentage of content is preferably 65% by mass or smaller, more preferably 60% by mass or smaller, and even may be 55% by mass or smaller.

In the resin composition of this invention, the xylylenediamine-based polyamide resin preferably accounts for 70% by mass or more of the resin component, which is more preferably 80% by mass or more.

The resin composition of this invention preferably contains an additional aliphatic polyamide resin. The aliphatic polyamide resin is preferably polyamide 6 or polyamide 66, and is more preferably polyamide 66. Percentage of the aliphatic polyamide resin preferably accounts for 1% by mass or more of the resin composition, which is more preferably 2% by mass or more, and even more preferably 3% by mass or more. The percentage is also preferably accounts 15% by mass or less, more preferably 10% by mass or less, and even more preferably 7% by mass or less. Within these ranges, the obtainable molded article will have distinctively improved light transmittance. The resin composition is also suitably used as a masterbatch for the convenience of addition of antimony oxide.

The resin composition of this invention preferably has a ratio by weight of the xylylenediamine-based polyamide resin and the aliphatic polyamide resin (preferably polyamide 66) of 100:10 to 20. With such structure, various additives may be properly dispersed in the xylylenediamine-based polyamide resin, and the effects of this invention will be demonstrated more beneficially.

An aliphatic polyamide resin having high crystallization speed (for example, polyamide 66), when further blended, can act as a nucleating agent, and can accelerate crystallization of the resin composition.

The resin composition of this invention preferably contains 25 to 75% by mass of polyamide resin relative to the resin composition. Percentage of the xylylenediamine-based polyamide resin preferably accounts for 35% by mass or more of the resin composition, which is more preferably 45% by mass or more. Meanwhile, the percentage is preferably 70% by mass or less, more preferably 65% by mass or less, and even may be 60% by mass or less.

The resin composition of this invention may contain only one kind of the polyamide resin, or two or more kinds. When two or more kinds are contained, the total content preferably falls within the aforementioned ranges.

The resin composition of this invention may contain, or need not contain, a thermoplastic resin other than the polyamide resin. In the resin composition of this invention, the content of the thermoplastic resin other than the polyamide resin, relative to the resin composition of this invention, is preferably 5% by mass or less, more preferably 3% by mass or less, and even more preferably 1% by mass or less.

<Halogen-Containing Flame Retardant>

The resin composition of this invention contains the halogen-containing flame retardant.

The halogen-containing flame retardant is preferably a bromine-containing flame retardant; more preferably brominated polystyrene, brominated polycarbonate, brominated epoxy resin, brominated phenoxy resin, brominated polyphenylene ether resin, brominated bisphenol A, glycidylbrominated bisphenol A, pentabromobenzyl polyacrylate or brominated imide; among which brominated polystyrene is particularly preferred.

This invention can also employ halogen-containing flame retardants described in paragraphs [0060] to [0063] of JP-A-2017-048376, the contents of which are incorporated by reference into this patent specification.

Content of the halogen-containing flame retardant in the resin composition of this invention is 1% by mass or more, preferably 2% by mass or more, more preferably 3% by mass or more, and even may be 5% by mass or more. Meanwhile, the content of the halogen-containing flame retardant in the resin composition of this invention is 10% by mass less, more preferably 9% by mass or less, and even more preferably 8% by mass or less.

The resin composition of this invention may contain only one kind of the halogen-containing flame retardant, or may contains two or more kinds. When two or more kinds are contained, the total content preferably falls within the aforementioned ranges.

In particular in this invention, whitening of the molded article may be suppressed effectively, by controlling the content of brominated polystyrene to 10% by mass or less, further to 9% by mass or less, and particularly to 8% by mass or less.

<Antimony Oxide>

The resin composition of this invention contains antimony oxide.

Antimony oxide is preferably antimony trioxide ($Sb_2O_3$) or antimony pentaoxide ($Sb_2O_5$), among which antimony trioxide is more preferred.

Content of antimony oxide in the resin composition of this invention is preferably 1% by mass or more, more preferably 2% by mass or more, and even more preferably 3% by mass or more. Moreover, the content of the antimony oxide in the resin composition of this invention is preferably 5% by mass or less, and more preferably 4% by mass or less.

The resin composition of this invention may contain one kind of antimony oxide, or may contain two or more kinds. When two or more kinds are contained, the total content preferably falls within the aforementioned ranges.

<Glass Fiber>

The resin composition of this invention preferably contains glass fiber.

The glass fiber contains A-glass, C-glass, ε-glass, S-glass or the like, among which ε-glass (non-alkali glass) is particularly preferred.

The glass fiber used for the resin composition of this invention may be a monofilament, or may be a multifilament obtained by twisting two or more monofilaments.

Form of the glass fiber may be any of "glass roving" which is a continuous roll of monofilament or multifilament, "chopped strand" having a cut length (number average fiber length) of 1 to 10 mm, "milled fiber" with a milling length (number average fiber length) of 10 to 500 µm, and so forth. Such glass fibers are marketed under the product names of "Glasslon chopped strand" and "Glasslon milled fiber" from Asahi Fiber Glass Co., Ltd., which are readily available. Glass fibers with different forms may be used in a combined manner.

Also glass fibers with modified cross-sectional shapes may be preferred in this invention. The modified cross-sectional shape is preferably defined by flatness, which is ratio (D2/D1) of long diameter D2 and short diameter D1 of a fiber when viewed in a cross-section taken in the direction normal to the longitudinal direction, which is typically 1.5 to 10, preferably 2.5 to 10, even more preferably 2.5 to 8, and particularly 2.5 to 5. Description on such flat glass in paragraphs [0065] to [0072] of JP-A-2011-195820 may be referred to, the contents of which are incorporated by reference into this patent specification.

The glass fiber in this invention may alternatively be glass bead or glass flake. The glass bead has a spherical shape with an outer diameter of 10 to 100 µm, which is typically marketed and readily available under the product name of "EGB731" from Potters Ballotin Ltd. Meanwhile, the glass flake has a flaky shape with a thickness of 1 to 20 µm and a length of a side of 0.05 to 1 mm, which is typically marketed and readily available under the product name of "Fleka" from Nippon Sheet Glass Company, Ltd.

In particular, the glass fiber used in this invention preferably has a weight-average fiber diameter of 1 to 20 µm, and a cut length (number average fiber length) of 100 µm to 1 cm (preferably 1 to 10 mm). Now, the weight-average fiber diameter of a glass fiber having a flattened cross-section is determined by a weight-average fiber diameter of a circle having the same area.

The glass fiber used in this invention is preferably treated on the surface thereof with a surface treatment agent such as silane coupling agent exemplified by γ-methacryloxypropyltrimethoxysilane, γ-glycidoxypropyltrimethoxysilane, and γ-aminopropyltriethoxysilane. Amount of adhesion of the surface treatment agent is preferably 0.01 to 1% by mass of the glass fiber. It is also preferable to use the glass fiber further optionally treated with lubricant such as aliphatic acid amide or silicone oil; antistatic agent such as quaternary ammonium salt; film-forming resin such as epoxy resin and urethane resin; and a mixture the film-forming resin with heat stabilizer, flame retardant and so forth. The glass fiber used in this invention may be sized with a sizing agent. The sizing agent in this case is preferably epoxy-based sizing agent or urethane-based sizing agent.

Content of the glass fiber in the resin composition of this invention is preferably 20% by mass or more, more preferably 25% by mass or more, and even may be 28% by mass or more. Meanwhile, content of the glass fiber in the resin composition of this invention is preferably 69% by mass or less, more preferably 55% by mass or less, even more preferably 50% by mass or less, yet more preferably 40% by mass or less, and even may be 35% by mass or less.

The resin composition of this invention may contain only one kind of the glass fiber, or two or more kinds. When two or more kinds are contained, the total content preferably falls within the aforementioned ranges.

<Light Transmitting Dye>

The resin composition of this invention, when intended for formation of the transmitting resin member to be used in laser welding, that is, intended for a light transmitting resin composition, further contains light transmitting dye.

The light transmitting dye used in this invention is typically a black dye, which is specifically exemplified by nigrosin, naphthalocyanine, aniline black, phthalocyanine, porphyrin, perinone, quaterrylene, azo dye, anthraquinone, pyrazolone, squaric acid derivatives, and immonium dye.

Commercially available products include e-BIND (product name) LTW-8731H (model name), and e-BIND (product name) LTW-8701H (model name) which are colorants manufactured by Orient Chemical Industries, Ltd.; Plast Yellow 8000, Plast Red M 8315 and Oil Green 5602 which are colorants manufactured by Arimoto Chemical Co., Ltd.; and Macrolex Yellow 3G, Macrolex Red EG, Macrolex Green 3, etc. which are colorants manufactured by LANXESS.

In particular, with the polyamide resin composition containing, as the light transmitting dye, at least one of pyrazolone, perinone and anthraquinone used therein, an obtainable molded article will be effectively suppressed from causing color migration after wet heat test.

The light transmitting dye may be a mixture of chromatic colorants. An exemplary embodiment relates to mixing of red colorant, blue colorant and green colorant to simulate black colorant.

Content of the light transmitting dye in the resin composition of this invention, when blended, is preferably 0.001% by mass or more of the resin composition, more preferably 0.006% by mass or more, even more preferably 0.018% by mass or more, and may also be 0.024% by mass or more, 0.030% by mass or more, and 0.050% by mass or more. The upper limit value is preferably 5.0% by mass or below, more preferably 2.0% by mass or below, even more preferably 1.0% by mass or below, yet more preferably 0.2% by mass or below, and may also be 0.1% by mass or below, and 0.06% by mass or below.

Only one kind of the light transmitting dye may be contained, or two or more kinds may be contained. When two or more kinds are contained, the total content preferably falls within the aforementioned ranges.

The resin composition of this invention preferably contains substantially no carbon black. Now "contains substantially no . . . " means that the content is 0.0001% by mass or less of the resin composition.

<Talc>

The resin composition of this invention may contain talc. In this invention, blending of talc can accelerate the crystallization.

Content of talc in the resin composition of this invention is preferably 0.05 to 20% by mass, more preferably 0.1 to 10% by mass, even more preferably 0.15 to 5% by mass, and particularly 0.2 to 3% by mass.

Only one kind of talc may be used, or two or more kinds may be used in a combined manner. When two or more kinds are used, the total content preferably falls within the aforementioned ranges.

<Mold Releasing Agent>

The resin composition of this invention preferably contains mold releasing agent.

The mold releasing agent is used principally for improving productivity when molding the resin composition. The mold releasing agent is exemplified by aliphatic carboxamide-based compound, aliphatic carboxylic acid, metal aliphatic carboxylate, ester formed between aliphatic carboxylic acid and alcohol, aliphatic hydrocarbon having a number average molecular weight of 200 to 15000, polysiloxane-based silicone oil, ethylene bis stearamide, and disterayl ketone. Among these mold releasing agents, carboxamide-based compound is particularly preferred.

The aliphatic carboxamide-based compound is exemplified by a compound obtainable by dehydration reaction of higher aliphatic monocarboxylic acid and/or polybasic acid, with diamine.

For details of the mold releasing agent, descriptions in paragraphs [0037] to [0042] of JP-A-2016-196563, and paragraphs [0048] to [0058] of JP-A-2016-078318 may be referred to, the contents of which are incorporated by reference into this patent specification.

The lower limit of content of the mold releasing agent, when blended, is preferably 0.001% by mass or above relative to the resin composition, more preferably 0.01% by mass or above, meanwhile the upper limit is preferably 2% by mass or below, and more preferably 1.5% by mass or below. Within these ranges, the mold releasing property may be improved, and die pollution during injection molding may be avoidable.

Only one kind of the mold releasing agent may be used, or two or more kinds may be used in a combined manner. When two or more kinds are used, the total content preferably falls within the aforementioned ranges.

<Other Ingredients>

The resin composition of this invention may contain still other ingredients, without departing from the spirit of this invention. Such other ingredients are exemplified by filler other than glass fiber, light stabilizer, antioxidant, UV absorber, fluorescent brightener, anti-dripping agent, antistatic agent, anti-clouding agent, lubricant, nucleating agent, anti-blocking agent, fluidity improver, plasticizer, dispersion aid, and antibacterial agent. Only one of these ingredients may be used, or two or more of them may be combined.

<Physical Properties of Polyamide Resin Composition>

The resin composition of this invention, when molded to a thickness of 1.0 mm, preferably has a light transmittance at 1070 nm of 16% or larger, which is more preferably 18% or larger. The upper limit of the light transmittance is not specifically limited, and may be practical enough if it is for example 50% or below, 30% or below, or even 25% or below. The light transmittance is measured by a method described later in EXAMPLES.

The resin composition of this invention, when molded to a thickness of 2.0 mm, preferably has a light transmittance at 1070 nm of 5% or larger, which is more preferably 6% or larger, even more preferably 7% or larger, and yet more preferably 8% or larger. The upper limit of the light transmittance is not specifically limited, and may be practical enough if it is for example 20% or below, 15% or below, or even 12% or below. The light transmittance is measured by a method described later in EXAMPLES.

The resin composition of this invention, when molded into a 1.5 mm thick test specimen and measured according to the UL94 standard, preferably complies with flammability rating V-0.

<Method for Manufacturing Resin Composition>

A method for manufacturing the resin composition of this invention is preferably, but not specifically limited to, a method using, as a kneader, a single-screw or twin-screw extruder having equipment with a vent hole for devolatalization. The polyamide resin component, the glass fiber and the other ingredients may be fed at a time into the kneader, or alternatively the other ingredient may be added sequentially to the polyamide resin component. The glass fiber is preferably side-fed into the kneader so as not to be crushed during kneading. Any two or more kinds of ingredients, selected from the ingredients, may be preliminarily mixed and kneaded.

In this invention, antimony oxide and the light transmitting dye are preferably prepared in the form of masterbatches using a thermoplastic resin, and then kneaded with the residual ingredients. More specifically, it is preferable to preliminarily prepare the masterbatches by kneading each of antimony oxide and the light transmitting dye with a polyamide resin (preferably polyamide 66), and then to knead the masterbatches with the polyamide resin component and the residual ingredients, to obtain the resin composition of this invention.

A method for manufacturing the resin composition of this invention is not specifically limited, and may employ any of molding methods generally applied to thermoplastic resin, such as injection molding, hollow molding, extrusion molding and press molding. A particularly preferred molding method in this case is injection molding for its excellent fluidity. In the injection molding, resin temperature is preferably controlled at 250 to 350° C.

This invention may also be used as a kit that contains the resin composition, and a light absorbing resin composition that contains the thermoplastic resin and the light absorbing dye. The kit is suitably used for manufacturing a molded article by laser welding.

That is, the resin composition contained in the kit serves as the light transmitting resin composition, and the molded article obtained by molding the light transmitting resin composition acts as a transmitting resin member that transmits laser light during laser welding. On the other hand, a molded article obtained by molding the light absorbing resin composition serves as the absorbing resin member that absorbs laser light during laser welding.

The kit in this invention can achieve a Galvano laser welding strength of 700 N or larger at a total energy input of 91 J, which may even be 800 N or larger. The upper limit value is typically 1000 N or below. Meanwhile, the kit in this invention can achieve a Galvano laser welding strength of 900 N or larger at a total energy input of 137 J, which may be even be 1000 N or larger. The upper limit value is typically 1500 N or below.

<<Light Absorbing Resin Composition>>

The light absorbing resin composition used in this invention contains the thermoplastic resin and the light absorbing dye, and may further contain an inorganic filler.

The thermoplastic resin is exemplified by polyamide resin, olefinic resin, vinyl-based resin, styrene-based resin, acrylic resin, polyphenylene ether resin, polyester resin, polycarbonate resin and polyacetal resin. In particular, polyamide resin, polyester resin and polycarbonate resin are preferred from the viewpoint of compatibility with the resin composition, among which polyamide resin is further preferred. The thermoplastic resin may be of one kind, or two or more kinds.

The polyamide resin used for the light absorbing resin composition may be those of any kind, for which the aforementioned polyamide resin (xylylenediamine-based polyamide resin or polyamide 66, and mixture of them) may be used, or is not necessarily used.

The inorganic filler is exemplified by laser light-absorbing fillers such as glass fiber, carbon fiber, silica, alumina, talc, carbon black, and inorganic powder coated with a laser-absorbing material. Glass fiber is preferred. The glass fiber is synonymous to the glass fiber which may be blended into the aforementioned resin composition of this invention, and also the same will apply to the preferred ranges.

The light absorbing dye is any of those having a maximum absorption within the wavelength range of laser light to be irradiated, which is within the range from 800 nm to 1100 nm in this invention, and is exemplified by inorganic pigments [black pigment such as carbon black (for example, acetylene black, lamp black, thermal black, furnace black, channel black, Ketjenblack, etc.); red pigment such as red iron oxide; orange pigment such as molybdate orange; white pigment such as titanium oxide]; and organic pigments (yellow pigment, orange pigment, red pigment, blue pigment and green pigment. Among them, the inorganic pigments are preferred for their high concealability, and black pigment is further preferred. Two or more kinds of these light absorbing dyes may be used in a combined manner. Content of the light absorbing dye is preferably 0.01 to 30 parts by mass, per 100 parts by mass of the resin component.

<<Laser Welding Method>>

Next, laser welding method will be explained. According to this invention, a molded article may be manufactured by joining, by laser welding, a molded article formed of the resin composition of this invention (transmitting resin member), and a molded article formed of the aforementioned light absorbing resin composition (absorbing resin member). Laser welding enables tight welding of the transmitting resin member and the absorbing resin member, without using an adhesive.

Shape of the members typically, but not restrictively, has at least a surface contactable part (flat face, curved face), for the convenience of joining of the members by laser welding. In laser welding, laser light transmitted through the transmitting resin member is absorbed by the absorbing resin member to fuse it, and thereby both members are welded. The molded article formed of the resin composition of this invention, having high laser transmittance, is suitably used as the transmitting resin member. Now, thickness of the member, through which laser light passes (thickness of a part where the laser light passes, measured in the direction of laser transmission), may suitably be determined depending on application, chemical composition of the resin composition and so forth, which is typically 5 mm or thinner, and preferably 4 mm or thinner.

Laser light source used for laser welding may be determined depending on absorption wavelength of the light absorbing dye. Laser light within the wavelength range from 800 to 1100 nm is preferred, for which semiconductor laser or fiber laser are employable.

More specifically, in an exemplary case where the transmitting resin member and the absorbing resin member are welded, first, the parts to be welded of both members are brought into contact. In this case, the parts to be welded are preferably kept under surface contact, which may be given by flat surfaces, curved surfaces, or combination of flat surface and curved surface. Next, laser light is irradiated from the side of the transmitting resin member. The laser light in this process may be condensed on the interface between both members, by using an optional lens. The thus condensed beam transmits through the transmitting resin member, and absorbed by the absorbing resin member at around the surface thereof, to thereby heat and melt the member. The heat then transmits by thermal conduction to the transmitting resin member to melt it, and thereby a molten pool is formed between both members, which joins both members after cooled.

The molded article thus formed by welding the transmitting resin member and the absorbing resin member has high bonding strength. Now, the molded article in this invention conceptually encompasses not only finished articles or components, but also components composing a part of them.

The molded article of this invention, obtained by laser welding, excels in mechanical strength, has high weld strength, causes less damages on resin due to laser light irradiation, and is therefore applicable to various applications including various storage containers, electric/electronic equipment component, office automation (OA) equipment component, home appliance component, machine mechanical component, vehicle mechanical component, and so forth. Particularly preferred applications include food containers, drug containers, oil and fat containers, vehicle hollow components (various tanks, intake manifold component, camera casing, etc.), vehicle electric components (various control units, ignition coil component, etc.), motor component, various sensor component, connector component, switch component, circuit breaker component, relay component, coil component, transformer component, and lamp component. The resin composition of this invention and the kit are particularly suitable for vehicle-borne camera module.

EXAMPLES

This invention will further be detailed referring to Examples. All materials, amounts of consumption, ratios, process details and procedures described in Examples below may suitably be modified, without departing from the spirit of this invention. Hence, the scope of this invention is by no means limited to specific Examples below.
Starting Materials
<Polyamide Resin>

Exemplary Synthesis 1

Into a 50-liter jacketed reactor equipped with a stirrer, a partial condenser, a cooling pipe, a thermometer, a dropping tank and a nitrogen gas feeding tube, placed were 14.87 kg of adipic acid, 24.5 g of sodium hypophosphite, and 13.3 g of sodium acetate, all being precisely weighed. The inside of the reactor was thoroughly replaced with nitrogen gas, and heated under a small flow rate of nitrogen gas, so as to dissolve adipic acid at 170° C. to prepare a uniform fluid. The fluid was kept stirred, to which 13.77 kg of metaxylylenediamine was added dropwise over 160 minutes. During the process, the inner temperature was continuously elevated up to 245° C., while eliminating water produced concurrently with the dropwise addition of metaxylylenediamine, through the partial condenser and the cooling pipe out of the system. After completion of the dropwise addition of metaxylylenediamine, the internal temperature was continuously elevated up to 260° C., and the reaction was allowed to continue for 15 minutes. The internal pressure of the reaction system was then continuously reduced down to 80 kPaG over 10 minutes, and the reaction was further allowed to continue for 10 minutes.

After completion of the reaction, the inside of the reactor was pressurized to 0.2 MPa with nitrogen gas, so as to eject the polymer in the form of strands out from a nozzle at the bottom of a polymerization tank, the strands were water-cooled, and pelletized to obtain polyamide 1 (phosphorus atom concentration=350 ppm by mass).

Exemplary Synthesis 2

The processes were conducted in the same way as in Exemplary Synthesis 1, except that 0.36 g of sodium hypophosphite and 0.20 g of sodium acetate were used, to obtain polyamide 2 (phosphorus atom concentration=5 ppm by mass). Reaction time after depressurizing down to 80 kPaG was 40 minutes. Polyamide 66: STABAMID AE271K, from Solvay
<Talc>
Micron White #5000S: from Hayashi Kasei Co., Ltd.
<Glass Fiber>
T-296GH: from Nippon Electric Glass Co., Ltd., weight-average fiber diameter=10.0±1.0 μm, cut length=3.0±1.0 mm
<Light Transmitting Dye>
LTW-8731H: e-BIND LTW-8731H, from Orient Chemical Industries, Ltd., masterbatch of polyamide 66 and light transmitting dye, for 50-fold dilution
<Light Absorbing Dye>
Carbon black: 4550, from Mitsubishi Chemical Corporation
<Halogen-Containing Flame Retardant>
Brominated polystyrene: SAYTEX, brominated PS (HP-3010PST), from Albemarle Corporation
<Antimony Oxide>
SICABATCH 404003: from AMG SICA, masterbatch of $Sb_2O_3$ and polyamide 66, with $Sb_2O_3$ content of 70% by mass
<Mold Releasing Agent>
Light-amide: WH-255, from Kyoeisha Chemical Co., Ltd.
<Method for Measuring Phosphorus Atom Concentration>
Measured using a 2.0 mm thick test specimen described later, and with a scanning X-ray fluorescent (XRF) analyzer. Tables 1 and 2 list the values in ×10$^{-4}$% by mass.
The analyzer used here was ZSX Primus, from Rigaku Corporation.

Example 1

<Compound>
The polyamide resin component, talc, light transmitting dye in the form of masterbatch, halogen-containing flame retardant, antimony oxide in the form of masterbatch, and mold releasing agent were individually weighed, and dry-blended according to the chemical compositions listed in Table 1 (contents of the individual component in Table 1 are given in %, by mass, the same will apply Tables 2 and 3), and fed from the base of a screw of a twin screw extruder (TEM-26SS, from Toshiba Machine Co., ltd.), using a twin screw cassette weighing feeder (CE-W-1-MP, from KUBOTA Corporation). The glass fiber was side-fed through a vibrating cassette weighing feeder (CE-V-1B-MP, from KUBOTA Corporation) into the aforementioned twin screw extruder, and kneaded with the resin components and so forth, to obtain resin composition pellets. Preset temperature of the extruder was 280° C.
<Light Transmittance>
Light transmittance was measured using a visible-UV spectrophotometer (UV-3100PC, from Shimadzu Corporation) at 1070 nm in %. More specifically, the thus-obtained resin composition pellets were dried at 120° C. for 4 hours, and molded into test specimens (1.0 mm thick, 2.0 mm thick) using an injection molding machine (SE-50D, from Sumitomo Heavy Industries, Ltd.). The molding was carried out at a cylinder temperature of 280° C., and at a die surface temperature of 130° C.

<Flame Retardance>

In compliance with Underwriters Laboratories Subject 94 (UL94 standard), five test specimens (1.5 mm thick) were subjected to flame retardance test. The test specimens were molded from the above-obtained resin composition pellets, after being dried at 120° C. for 4 hours, using an injection molding machine (from Sumitomo Heavy Industries, Ltd., SE-50D).

The flame retardance was classified into V-0, V-1, V-2 and NG (rejected), according to a method described in the UL94 standard. V-0 represents most excellent flame retardance.

<Appearance (Visual Observation)>

Appearance of the 2.0 mm thick test specimen was checked by visual observation:
A: looked black;
B: looked slightly brownish black; and
C: looked brown.

<Appearance (L* Value (Reflection Method), 2 mm Thick)>

The 2.0 mm thick test specimen was subjected to measurement of L* value (reflection method), in compliance with JIS Z-8781-4.

<Flexural Strength>

The resin pellets obtained by the aforementioned manufacturing method were dried at 120° C. for 4 hours, and injection-molded into a 4 mm thick ISO tensile specimen, using NEX140III from Nissei Plastic Industrial Co., Ltd. The molding was carried out at a cylinder temperature of 280° C., and at a die surface temperature of 130° C.

Flexural strength of the ISO tensile specimen (4 mm thick) was measured at 23° C., in compliance with ISO 178.

Examples 2 to 12, Comparative Examples 1 to 3

Processes were carried out in the same way as in Example 1, except for that the chemical compositions were changed as summarized in Tables 1 and 2.

TABLE 1

| Starting Material | Example 1 | Comparative Example 1 | Example 2 | Example 3 | Example 4 |
|---|---|---|---|---|---|
| MXD6 with phosphorus concentration of 350 ppm by mass | | | 0.5 | 1 | 2 |
| MXD6 with phosphrus concentration of 5 ppm by mass | 49.3 | 44.3 | 48.8 | 48.3 | 47.3 |
| Polyamide 66 | 4 | 4 | 4 | 4 | 4 |
| Talc | 2.5 | 2.5 | 2.5 | 2.5 | 2.5 |
| Glass fiber | 30 | 30 | 30 | 30 | 30 |
| Light transmitting dye (masterbatch) | 2 | 2 | 2 | 2 | 2 |
| Halogen-containing flame retardant | 7 | 7 | 7 | 7 | 7 |
| Masterbatch containing 70% by mass of antimony | 5 | 10 | 5 | 5 | 5 |
| Mold releasing agent | 0.2 | 0.2 | 0.2 | 0.2 | 0.2 |
| Total | 100 | 100 | 100 | 100 | 100 |
| XRF analytical result of phosphorus atom concentration in composition ($\times 10^{-4}$% by mass) | 52 | 51 | 49 | 54 | 54 |
| Transmittance at 1070 nm (1 mm thick) | 19 | 12 | 20 | 20 | 21 |
| Transmittance at 1070 nm (2 mm thick) | 9 | 5 | 9 | 9 | 10 |
| UL94 flame retardance of 1.5 mm thick specimen | V-0 | V-0 | V-0 | V-0 | V-0 |
| Appearance    Visual observation | B | B | B | B | B |
| L* value (reflection method) | 24.91 | 31.03 | 24.67 | 24.93 | 23.82 |
| Flexural strength (MPa) | 304 | 297 | 304 | 301 | 304 |

| Starting Material | Example 5 | Example 6 | Example 7 |
|---|---|---|---|
| MXD6 with phosphorus concentration of 350 ppm by mass | 3 | 4 | 5 |
| MXD6 with phosphrus concentration of 5 ppm by mass | 46.3 | 45.3 | 44.3 |
| Polyamide 66 | 4 | 4 | 4 |
| Talc | 2.5 | 2.5 | 2.5 |
| Glass fiber | 30 | 30 | 30 |
| Light transmitting dye (masterbatch) | 2 | 2 | 2 |
| Halogen-containing flame retardant | 7 | 7 | 7 |
| Masterbatch containing 70% by mass of antimony | 5 | 5 | 5 |
| Mold releasing agent | 0.2 | 0.2 | 0.2 |
| Total | 100 | 100 | 100 |
| XRF analytical result of phosphorus atom concentration in composition ($\times 10^{-4}$% by mass) | 63 | 63 | 75 |
| Transmittance at 1070 nm (1 mm thick) | 20 | 19 | 20 |
| Transmittance at 1070 nm (2 mm thick) | 9 | 8 | 9 |
| UL94 flame retardance of 1.5 mm thick specimen | V-0 | V-0 | V-0 |
| Appearance    Visual observation | B | B | B |
| L* value (reflection method) | 24.77 | 23.98 | 24.84 |
| Flexural strength (MPa) | 300 | 301 | 316 |

TABLE 2

| Starting Material | Example 8 | Comparative Example 2 | Example 9 | Example 10 |
|---|---|---|---|---|
| MXD6 with phosphorus concentration of 350 ppm by mass | 6 | 54.3 | | |
| MXD6 with phosphrus concentration of 5 ppm by mass | 43.3 | | 46.3 | 50.8 |
| Polyamide 66 | 4 | 4 | 4 | 4 |
| Talc | 2.5 | 2.5 | 2.5 | 2.5 |
| Glass fiber | 30 | 30 | 30 | 30 |
| Light transmitting dye (masterbatch) | 2 | 2 | 5 | 0.5 |
| Halogen-containing flame retardant | 7 | 7 | 7 | 7 |
| Masterbatch containing 70% by mass of antimony | 5 | | 5 | 5 |
| Mold releasing agent | 0.2 | 0.2 | 0.2 | 0.2 |
| Total | 100 | 100 | 100 | 100 |
| XRF analytical result of phosphorus atom concentration in composition ($\times 10^{-4}$% by mass) | 72 | 205 | 55 | 55 |
| Transmittance at 1070 nm (1 mm thick) | 20 | 42 | 19 | 20 |
| Transmittance at 1070 nm (2 mm thick) | 9 | 26 | 8 | 9 |
| UL94 flame retardance of 1.5 mm thick specimen | V-0 | NG | V-0 | V-0 |
| Appearance   Visual observation | B | B | A | C |
| L* value (reflection method) | 24.67 | 12.89 | 16.14 | 42.51 |
| Flexural strength (MPa) | 311 | 312 | 318 | 306 |

| Starting Material | Example 11 | Example 12 | Comparative Example 3 |
|---|---|---|---|
| MXD6 with phosphorus concentration of 350 ppm by mass | 10 | 20 | 49.3 |
| MXD6 with phosphrus concentration of 5 ppm by mass | 39.3 | 29.3 | |
| Polyamide 66 | 4 | 4 | 4 |
| Talc | 2.5 | 2.5 | 2.5 |
| Glass fiber | 30 | 30 | 30 |
| Light transmitting dye (masterbatch) | 2 | 2 | 2 |
| Halogen-containing flame retardant | 7 | 7 | 7 |
| Masterbatch containing 70% by mass of antimony | 5 | 5 | 5 |
| Mold releasing agent | 0.2 | 0.2 | 0.2 |
| Total | 100 | 100 | 100 |
| XRF analytical result of phosphorus atom concentration in composition ($\times 10^{-4}$% by mass) | 81 | 114 | 187 |
| Transmittance at 1070 nm (1 mm thick) | 20 | 18 | 5 |
| Transmittance at 1070 nm (2 mm thick) | 9 | 7 | 4 |
| UL94 flame retardance of 1.5 mm thick specimen | V-0 | V-0 | V-0 |
| Appearance   Visual observation | B | B | B |
| L* value (reflection method) | 24.43 | 24.44 | 24.31 |
| Flexural strength (MPa) | 308 | 307 | 305 |

As clearly taught by the results above, the resin compositions of this invention were found to yield the molded articles with excellent flame retardance and high transmittance, and further found to have good appearance and high mechanical strength (Examples 1 to 12). In contrast, large content of antimony oxide unfortunately resulted in low transmittance (Comparative Example 1). Absence of antimony oxide yielded high transmittance but resulted in poor flame retardance (Comparative Example 2). High phosphorus atom concentration unfortunately resulted in poor transmittance (Comparative Example 3).

FIG. 1 is a drawing illustrating mapping of Examples 1 to 12 and Comparative Examples 1 to 3, while plotting transmittance at 1070 nm of the 1 mm-thick test specimen on the ordinate, and plotting phosphorus atom concentration on the abscissa. As can be seen in FIG. 1, phosphorus atom concentrations when reached a predetermined level or beyond resulted in distinctive drop of transmittance.

Example 13

The resin composition pellets obtained in Example 1 were dried at 120° C. for 4 hours, and a light transmitting member test specimen (1.5 mm thick) was manufactured using an injection molding machine (SE-50D, from Sumitomo Heavy Industries, Ltd.).

Meanwhile, a light absorbing test specimen (1.5 mm thick) was manufactured in the same way as in Example 1, except for that the light transmitting dye was not blended, but 0.4% by mass of light absorbing dye, and 50.9% by mass of MXD6 with a phosphorus atom concentration of 5 ppm by mass were used.

The above-obtained light transmitting member test specimen and the light absorbing member test specimen were subjected to measurement of Galvano laser weld strength.

Figure 2:
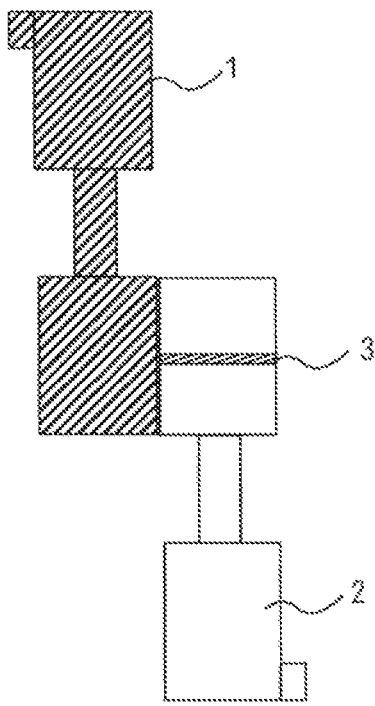
FIG. 2 A schematic drawing illustrating a welded state of ASTM No. 4 dumbbell specimens.

More specifically, as illustrated in FIG. 2, the light transmitting member test specimen and the light absorbing member test specimen were stacked and welded. In FIG. 2, reference sign 1 represents the transmitting resin member test specimen, 2 represents the absorbing resin member test specimen, and 3 represents a laser irradiation area. Again in FIG. 2, projections at the left top end of the transmitting resin member 1 and at the right bottom end of the absorbing resin member 2 indicate the gate sides.

Laser irradiation was carried out with fiber laser (1070 nm) irradiated using an ordinary Galvano mirror scanner (marketed by Fine Device Co., Ltd.), laser beam diameter=2 mm), at a laser output of 30 W to 200 W and a scanning speed of 70 to 2000 mm/sec, so as to adjust the scanning width (welding width, the width of the area 3 in FIG. 2) to 16 mm. Total energy input for welding was set to 91 J or 137 J, and press pressure of the light transmitting member test specimen and the light absorbing member test specimen was set to 0.5 MPa (600 N).

Now, equations below are given:

Energy input (J)=Energy density (J/mm)×Total scanning length (mm)

Energy density (J/mm)=Laser output (W)×Feed speed (mm/sec)

The welded test specimens were subjected to measurement of laser weld strength. The weld strength was measured using a tensile tester ("Model 5544" from Instron) (load cell±2 kN), and the light transmitting member test specimen and the light absorbing member test specimen, integrated by welding, were clamped at both ends in the longitudinal direction thereof, and pulled at a tensile speed of 5 mm/min. Results are summarized in Table 3.

Comparative Example 4

The resin composition pellets obtained in Comparative Example 3 were dried at 120° C. for 4 hours, and a light transmitting member test specimen (1.5 mm thick) was manufactured using an injection molding machine (SE-50D, from Sumitomo Heavy Industries, Ltd.).

Meanwhile, a light absorbing test specimen (1.5 mm thick) was manufactured in the same way as in Comparative Example 3, except for that the light transmitting dye was not blended, but 0.4% by mass of light absorbing dye, and 50.9% by mass of MXD6 with a phosphorus atom concentration of 350 ppm by mass were used.

The thus obtained test specimen was subjected to measurement of laser weld strength, in the same way as in Example 13.

TABLE 3

|  | Example 13 | Comparative Example 4 |
|---|---|---|
| Total energy input = 91 J | 829 N | Not welded |
| Total energy input = 137 J | 1098 N | Not welded |

REFERENCE SIGNS LIST

1 transmitting resin member test specimen
2 absorbing resin member test specimen
3 laser irradiation area

The invention claimed is:

1. A polyamide resin composition comprising a polyamide resin, 1 to 10% by mass of a halogen-containing flame retardant, 1 to 5% by mass of antimony oxide, and 0.001% by mass to 5.0% by mass of a light transmitting dye, relative to 100% by mass of the polyamide resin composition, wherein
the polyamide resin composition has at least one phosphorus atom and has a phosphorus atom concentration of $1.50 \times 10^{-2}$% by mass or less, and
the polyamide resin composition, when molded to a thickness of 1.0 mm, has a light transmittance at 1070 nm in a range of 16% to 21%.

2. The polyamide resin composition of claim 1, wherein the polyamide resin contains a semi-aromatic polyamide resin.

3. The polyamide resin composition of claim 2, wherein the polyamide resin contains a polyamide resin containing a structural unit derived from a diamine and structural unit derived from a dicarboxylic acid, 70 mol % or more of the structural unit derived from a diamine being derived from xylylenediamine, and 70 mol % or more of the structural unit derived from a dicarboxylic acid being derived from a straight-chain α,ω-dicarboxylic acid having 4 to 20 carbon atoms.

4. The polyamide resin composition of claim 2, wherein the halogen-containing flame retardant is a bromine-containing flame retardant.

5. The polyamide resin composition of claim 2, wherein the halogen-containing flame retardant is a brominated polystyrene.

6. The polyamide resin composition of claim 2, wherein the antimony oxide is antimony trioxide.

7. The polyamide resin composition of claim 2, wherein the at least one phosphorus atom in the polyamide resin is derived from hypophosphite.

8. The polyamide resin composition of claim 1, wherein the polyamide resin contains a polyamide resin containing a structural unit derived from a diamine and structural unit derived from a dicarboxylic acid, 50 mol % or more of the structural unit derived from a diamine being derived from xylylenediamine, and 50 mol % or more of the structural unit derived from a dicarboxylic acid being derived from a straight-chain α,ω-dicarboxylic acid having 4 to 20 carbon atoms.

9. The polyamide resin composition of claim 1, wherein the polyamide resin contains a polyamide resin containing a structural unit derived from a diamine and structural unit derived from a dicarboxylic acid, 70 mol % or more of the structural unit derived from a diamine being derived from xylylenediamine, and 70 mol % or more of the structural unit derived from a dicarboxylic acid being derived from a straight-chain α,ω-dicarboxylic acid having 4 to 20 carbon atoms.

10. The polyamide resin composition of claim 1, wherein the halogen-containing flame retardant is a bromine-containing flame retardant.

11. The polyamide resin composition of claim 1, wherein the halogen-containing flame retardant is a brominated polystyrene.

12. The polyamide resin composition of claim 1, wherein the antimony oxide is antimony trioxide.

13. The polyamide resin composition of claim 1, wherein the at least one phosphorus atom in the polyamide resin is derived from hypophosphite.

14. The polyamide resin composition of claim 1, further comprising 20 to 69% by mass of a glass fiber.

15. The polyamide resin composition of claim 1, complying with flammability rating V-0 when molded into a thickness of 1.5 mm and measured according to the UL94 standard.

16. The polyamide resin composition of claim 1, having a light transmittance measured at 1070 nm of 5% or larger, when formed into a thickness of 2.0 mm.

17. A kit comprising:
a polyamide resin composition described in claim 1, and
a light absorbing resin composition that contains a thermoplastic resin and a light absorbing dye.

18. A method for manufacturing a molded article, the method comprising joining, by laser welding, a molded article formed of a polyamide resin composition described in claim 1, and a molded article formed of a light absorbing resin composition that contains a thermoplastic resin and a light absorbing dye.

19. A molded article formed of a polyamide resin composition described in claim 1.

* * * * *